(12) United States Patent
Tanimoto

(10) Patent No.: US 7,454,468 B2
(45) Date of Patent: Nov. 18, 2008

(54) ELECTRONIC MAIL CLIENT AND RECORDING MEDIUM RECORDING PROGRAM FOR CLIENT

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 842 days.

(21) Appl. No.: 10/632,863

(22) Filed: Aug. 4, 2003

(65) Prior Publication Data

US 2004/0034691 A1    Feb. 19, 2004

(30) Foreign Application Priority Data

Aug. 19, 2002   (JP) .............. 2002-237949

(51) Int. Cl.
   *G06F 15/16* (2006.01)
(52) U.S. Cl. .................................................. 709/206
(58) Field of Classification Search ................. 709/206
   See application file for complete search history.

(56) References Cited

U.S. PATENT DOCUMENTS

| | | | | | |
|---|---|---|---|---|---|
| 4,835,730 | A | * | 5/1989 | Shimano et al. | 700/257 |
| 5,424,724 | A | * | 6/1995 | Williams et al. | 370/403 |
| 5,461,488 | A | * | 10/1995 | Witek | 358/402 |
| 5,956,715 | A | * | 9/1999 | Glasser et al. | 707/9 |

FOREIGN PATENT DOCUMENTS

| JP | 01-274542 A | 11/1989 |
|---|---|---|
| JP | 04-160950 A | 6/1992 |
| JP | 07-066829 A | 3/1995 |
| JP | 11-164121 A | 6/1999 |
| JP | 11-351560 A | 12/1999 |
| JP | 2001-86152 | 3/2001 |
| JP | 2001-216216 A | 8/2001 |
| JP | 2001-308922 A | 11/2001 |
| JP | 2001-358885 A | 12/2001 |

(Continued)

OTHER PUBLICATIONS

Aihara Katsuji, "Facsimile Equipment," Jun. 18, 1999, JPO Machine Translation of Pub. No. JP 11-164121.*

(Continued)

*Primary Examiner*—Andrew Caldwell
*Assistant Examiner*—Christopher Biagini
(74) *Attorney, Agent, or Firm*—Westerman, Hattori, Daniels & Adrian, LLP.

(57) ABSTRACT

A plurality of mail servers are registered along with a priority order, and normally, a mail server is selected in accordance with the priority order, and the electronic mail is transmitted. When a failure generates in the selected mail server, the electronic mail is transmitted by using a mail server of next in order. When failing in the transmission of the electronic mail via the selected mail server, it is determined whether to select a mail server of next in order, to establish a connection again with the mail server that was selected at the time of the failure in the transmission of the electronic mail, or to cancel the transmission, in accordance with contents of the failure. Since a plurality of mail servers can be used, even when a failure generates in a mail server, the electronic mail can be transmitted by using another mail server.

15 Claims, 4 Drawing Sheets

FOREIGN PATENT DOCUMENTS

| | | |
|---|---|---|
| JP | 2002-158826 A | 5/2002 |
| JP | 2002-215472 A | 8/2002 |
| JP | 2002-223342 A | 8/2002 |

OTHER PUBLICATIONS

Jonathan B. Postal, "RFC 821: Simple Mail Transfer Protocol," Aug. 1982, Information Sciences Institute, pp. 1-68.*

LC, "more than one smtp server," USENET Post, Nov. 21, 2000, accessed Mar. 27, 2007 via Google Groups: <http://groups.google.com/group/comp.mail.pine/browse_thread/thread/ed2b37942472b42/54ffa7a8d10acd2d>.*

Wesley Alan Wright, "Mac mail," accessed Mar. 27, 2007: <http://www.uvm.edu/~waw/MacOSX/mail/>.*

Notification of Reason(s) for Refusal dated Oct. 3, 3006 issued on the basic Japanese Patent Application No. 2002-237949.

Japanese Office Action dated Jan. 19, 2007, issued in corresponding Japanese patent application No. 2002-237949.

* cited by examiner

FIG. 2

| ORDER | IP ADDRESS |
|---|---|
| 1 (NORMAL) | 200.XXX.100.XXX |
| 2 | 200.XXX.230.XXX |
| 3 | 120.XXX.123.XXX |

| TRANSMITTER | DESTINATION | BYPASS |
|---|---|---|
| A | | O |
| B | | O |
| ⋮ | | |
| X | | X |
| | a | O |
| | b | O |
| | ⋮ | |
| | n | X |

22

| MAIL CLIENT (TRANSMITTER) LOG | | | |
|---|---|---|---|
| DATE AND TIME | DESTINATION | SMTP SERVER | RESULT |
| 02.07.01 10:15:30 | abc@muratec.co.jp | 200.XXX.100.XXX | TCP error |
| 02.07.01 10:15:50 | abc@muratec.co.jp | 200.XXX.230.XXX | SMTP OK |

ELECTRONIC MAIL CLIENT AND RECORDING MEDIUM RECORDING PROGRAM FOR CLIENT

FIELD OF THE INVENTION

The present invention relates to an electronic mail client such as an Internet facsimile machine, and a recording medium which records a program for the electronic mail client.

DESCRIPTION OF THE RELATED ART

An electronic mail client such as an Internet facsimile machine transmits an electronic mail via a mail server. When a failure is generated in the mail server, the electronic mail cannot be transmitted until the setting is changed to another mail server.

SUMMARY OF THE INVENTION

An advantage of the present invention is to provide an electronic mail client and a program for the electronic mail client which can transmit an electronic mail even when a failure is generated in a mail server.

Another advantage of the present invention is to change a mail server flexibly in accordance with the cause of a failure in a transmission of an electronic mail. Furthermore, another advantage of the present invention is to transmit an important electronic mail without delay and to reduce the load placed on an auxiliary mail server.

An electronic mail client of the present invention is a client which transmits an electronic mail via a mail server. The electronic mail client includes a storage unit which stores a plurality of mail servers and a priority ordering of the mail servers. A mail server is selected in accordance with the priority order stored in the storage unit, and an electronic mail is transmitted via the selected mail server. When failing in the transmission of the electronic mail via the selected mail server, the electronic mail is retransmitted via a mail server of next in order.

When failing in the transmission of the electronic mail, it is determined whether to select a mail server of next in order, to establish a connection again with the mail server that was selected at the time of the failure in the transmission of the electronic mail, or to cancel the transmission, in accordance with contents of the failure. For example, when failing to establish a connection with the mail server, a possibility is high for the failure being generated in a communication channel or the mail server. Therefore, the mail server of the next order is selected without waiting for an elapse of waiting time. When the connection to the mail server is established but a temporary error generated during the communication, a connection is established again with the same mail server without selecting the mail server of the next order. Moreover, when there is a mistake in a destination, since it is obvious that the electronic mail cannot be transmitted even by retransmitting the electronic mail, the transmission of the electronic mail is canceled.

The electronic mail server includes a storage unit which stores a determination of whether to select a mail server of next in order for each transmitter or each destination.

A program for a client which is recorded in a recording medium of the present invention includes a command for storing a plurality of mail servers along with a priority order of the mail servers, a command for selecting a mail server in accordance with the stored priority order, and a command for selecting a mail server of next order when failing to transmit the electronic mail via the selected mail server. The electronic mail is transmitted via a selected mail server. Further, the transmission of the electronic mail itself can be executed by a program which is different from the program of the present invention. Therefore, the program of the present invention executes processing until selecting a mail server of next in order when failing in the transmission of the electronic mail.

In the electronic mail client of the present invention, even when failing in a transmission of an electronic mail via a mail server ranked high in the priority order, the electronic mail can be transmitted via a mail server of next in order. Therefore, even when a failure generates in the mail server ranked high in the priority order, the electronic mail can be transmitted.

Moreover, when failing in the transmission of the electronic mail, it is determined whether to establish a connection with a mail server of next in order, to establish a connection again with the mail server that was selected at the time of the failure in the transmission of the electronic mail, or to cancel the transmission, in accordance with the contents of the failure. Therefore, while using the mail server ranked higher in the priority order as much as possible, it is considered whether it is efficient to change the mail server, and the mail server can be selected flexibly. When a success in the transmission of the electronic mail cannot be expected even by retransmitting the electronic mail, the transmission processing can be canceled. As a result, unnecessary transmission processing is not carried out.

Furthermore, it can be determined whether or not to use the mail server of the next order according to a transmitter or a destination. Therefore, the electronic mail of a transmitter which has high level of authority, or the electronic mail addressed to an important destination can be transmitted promptly, and load placed on an auxiliary mail server can be reduced.

In the program which is recorded in the recording medium of the present invention, even when failing in the transmission of the electronic mail via the mail server which is ranked high in the priority order, the electronic mail can be transmitted via a mail server of the next order. Therefore, even when a failure generates in the mail server ranked high in the priority order, the electronic mail can be transmitted.

BRIEF DESCRIPTION OF THE DRAWINGS

FIG. 2 shows a mail server list in the mail client of the embodiment.

FIG. 3 shows a bypass permission table in the mail client of the embodiment.

DETAILED DESCRIPTION OF THE PREFERRED EMBODIMENTS

Figure 1:
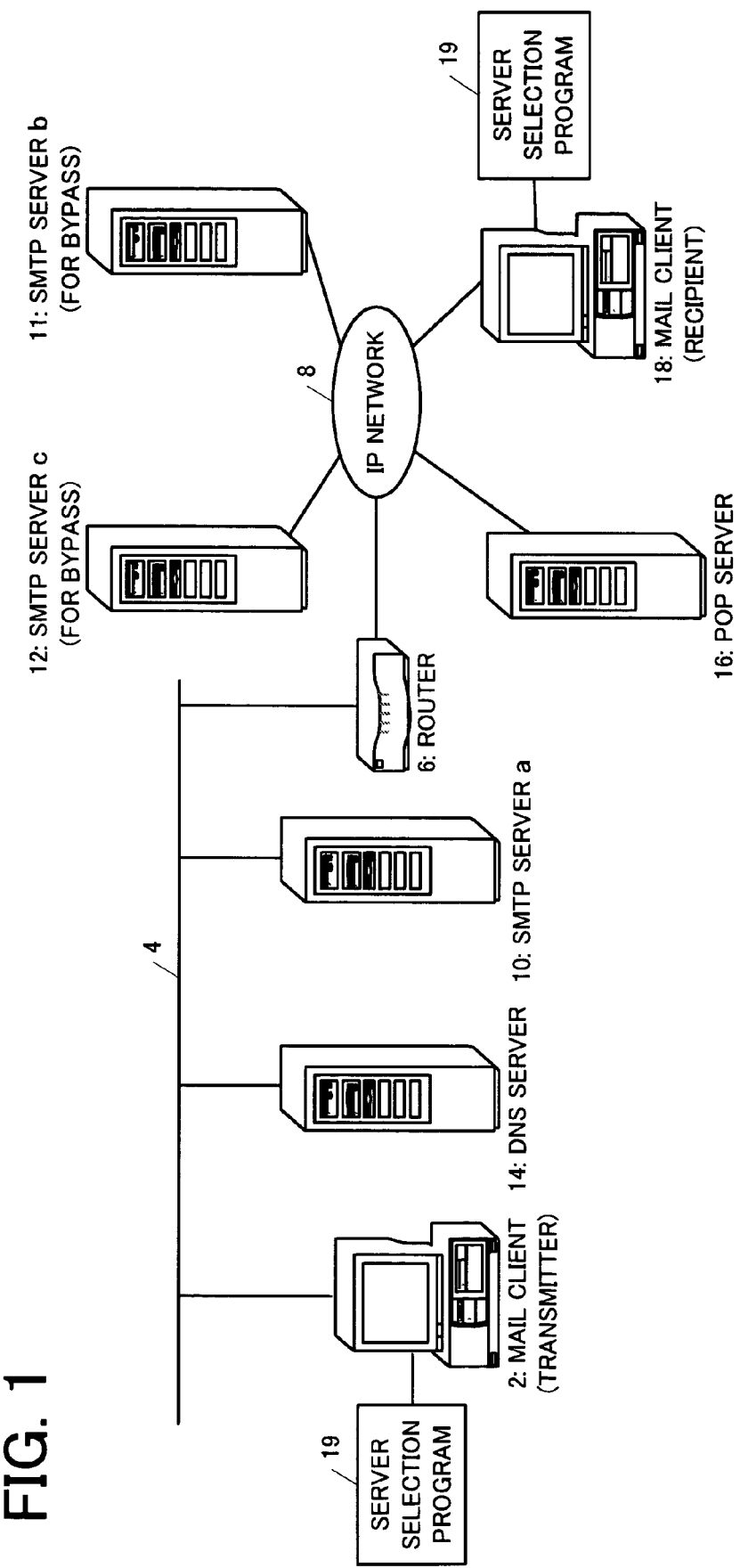
FIG. 1 is a block diagram showing an environment in which a mail client of an embodiment is used.

FIG. 1 through FIG. 6 show an embodiment of the present invention. FIG. 1 shows an environment in which an electronic mail is transmitted and received between a mail client 2 of a transmitter and a mail client 18 of a recipient. For example, the mail clients 2, 18 are an Internet facsimile machine, a personal computer or the like. Moreover, the mail clients 2, 18 store a server selection program 19 for selecting a mail server (a Simple Mail Transfer Protocol (SMTP) server). Reference number 4 is a Local Area Network (LAN), 6 is a router, and 8 is the Internet.

Reference numbers 10~12 are SMTP servers. The mail server 10 (SMTP server (a)) is a mail server which is ranked first in a priority order, and which is used normally. The mail server 11 (SMTP server (b)) is an auxiliary mail server for bypass which is ranked second in the priority order. The mail server 12 (SMTP server (c)) is a mail server which is ranked third in the priority order, and which is used when both of the mail servers 10 and 11 cannot be used. In the above description, two auxiliary mail servers 11 and 12 are provided for bypass. However, a number of auxiliary mail servers to be provided for bypass can be any number. In addition, although the auxiliary mail servers 11 and 12 for bypass are provided outside the LAN 4 in the above description, the mail servers Hand 12 can be provided inside the LAN 4.

Reference number 14 is a Domain Name System (DNS) server. The DNS server 14 is used for when it is necessary to know an Internet Protocol (IP) address of the mail servers hand 12 or the like. It is possible for the DNS server 14 to not be provided. Reference number 16 is a Post Office Protocol (POP) server, and is a destination of electronic mails addressed to a mail client 18. The mail client 18 fetches from the POP server 16, an electronic mail addressed to the mail client 18.

FIG. 2 shows a mail server list 20 which includes IP address of the mail servers for normal use and for bypass. The list 20 is data necessary for the server selection program 19. The selection program 19 includes commands for forming and managing the list 20. A manager or the like of the mail client 2 can register a mail server with the list 20 via the selection program 19. In the list 20 shown in FIG. 2, an address of a mail server is written as an IP address. However, an address of a mail server can be written as a domain name or the like instead. In the mail server list 20, the IP address of the mail servers which can be used by the mail client 2 and the priority order of the mail servers are written. The mail server list 20 can be rewritten from the mail client 2. The mail server which is ranked first in the priority order is used normally. When an electronic mail cannot be transmitted via this mail server, the mail server of next in order is used. In the same manner, the mail server ranked next in the priority order is selected.

FIG. 3 shows a bypass permission table 22. The table 22 has data of the server selection program 19. For each transmitter, it is written whether or not a bypass is possible (to transmit by using an auxiliary mail server). In the same manner, for each destination, it is designated whether or not a bypass is possible. In the table 22, a determination of whether the bypass is possible is written for both the transmitter and the destination. However, the determination can be written for only either one of the transmitter or the destination. In the present embodiment, when one of the transmitter or the destination can bypass, the bypass is possible. However, the present invention is not limited to this example. Furthermore, the bypass permission table can be formed or rewritten by the mail client 2 or the like via a command of the server selection program.

For example, in the table 22, a transmitter A can bypass, and when a failure generates in the SMTP server (a), the transmitter A can transmit an electronic mail by using the SMTP servers (b), (c). This description also applies for a transmitter B. However, a transmitter X cannot bypass, and when failing in the transmission of an electronic mail via the SMTP server (a), the transmitter X attempts retransmission via the same SMTP server (a). When there is a failure in the SMTP server (a) that failure is not temporary, the transmitter X cannot transmit the electronic mail until the SMTP server (a) recovers. This is due to a fact that the transmitter determines whether a bypass can be carried out based on an authority of the transmitter to facilitate a management of the transmission of the electronic mail. For example, the auxiliary mail servers 11 and 12 can be prevented from being abused by limiting whether or not to select the mail servers 11 and 12 of next in order for bypass according to a level of the authority of the transmitter when the load of the mail servers 11 and 12 for bypass is large even normally.

Regarding the destination of the electronic mail, when the destination (a) or the destination (b) can be bypassed and there is a failure in the SMTP server (a), the electronic mail can be transmitted by using the SMTP servers (b), (c). However, a destination (n) cannot be bypassed. This is due to a fact that a determination of whether a destination can be bypassed is made for each destination to facilitate a management of the transmission of the electronic mail. While preventing a delay in the transmission of an electronic mail to an especially important destination, the mail server for bypass can be prevented from being abused.

Figure 4:
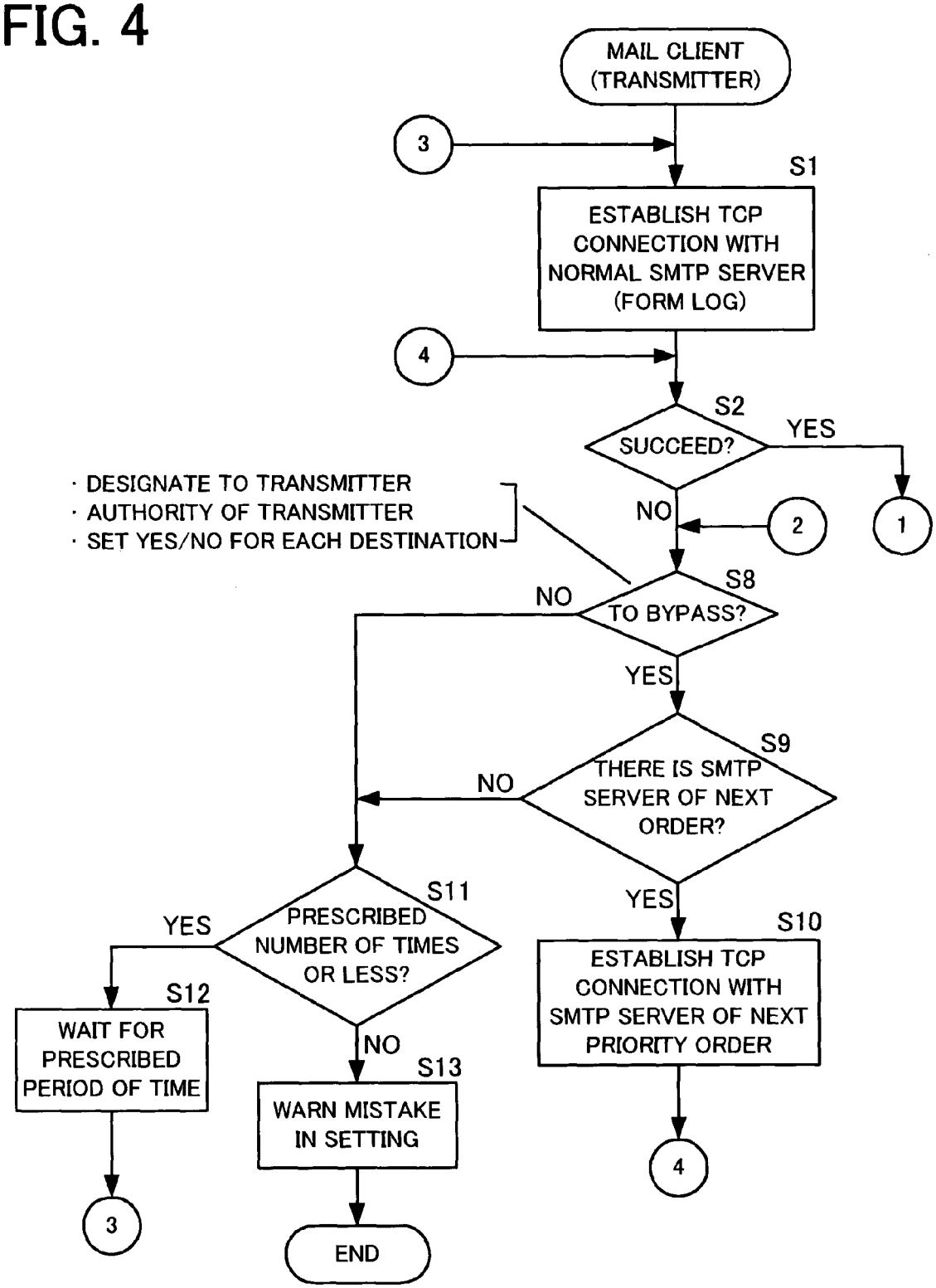
FIG. 4 is a flowchart showing processing of when the mail client of the embodiment fails in a Transmission Control Protocol (TCP) connection with a Simple Mail Transfer Protocol (SMPT) server.
Figures 5, 6:
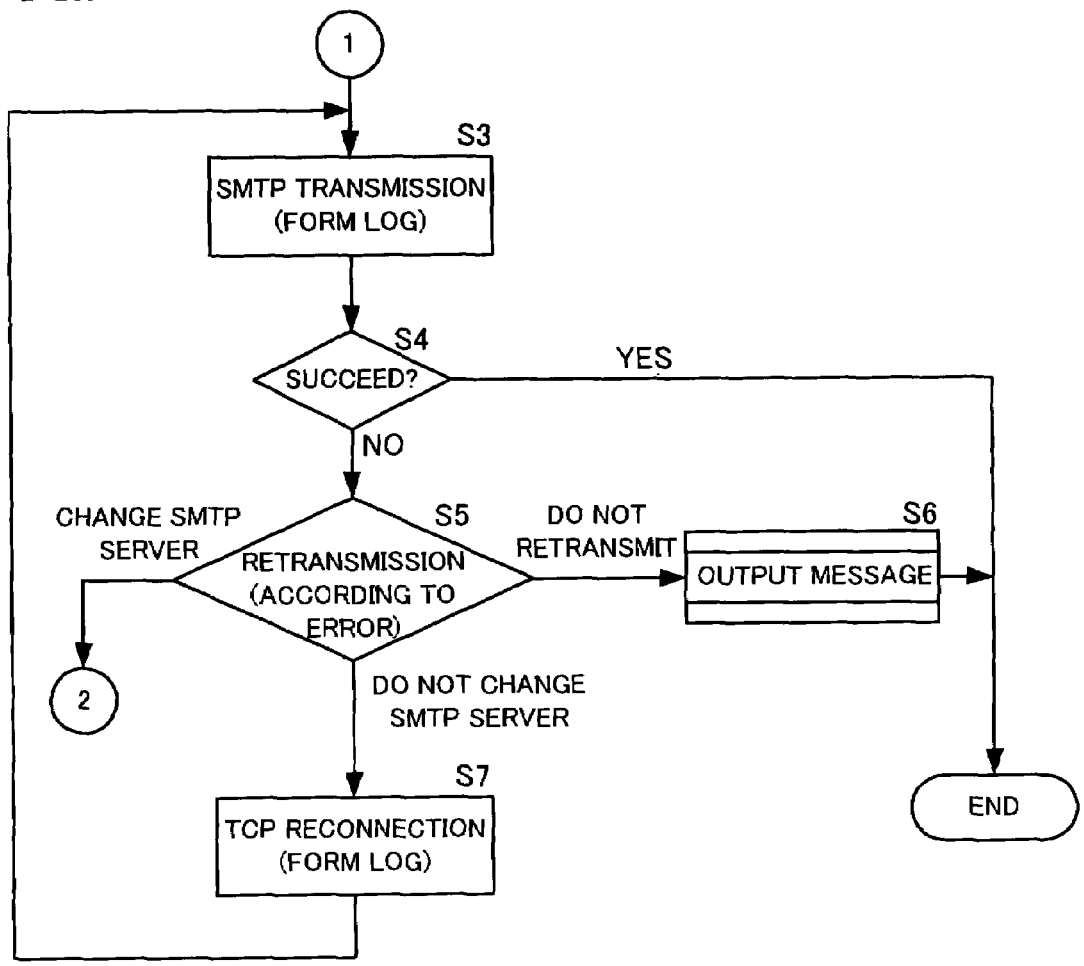
FIG. 5 is a flowchart showing processing of when the mail client of the embodiment fails in an SMTP transmission.
FIG. 6 is a schematic view showing a transmission log table of the mail client of the embodiment.

FIG. 4 and FIG. 5 show procedures to change the SMTP server. The mail client of the transmitter establishes a Transmission Control Protocol (TCP) connection to a normal SMTP server (mail server ranked first in the priority order), and forms a log of the TCP connection (step S1). When succeeding in the TCP connection (step S2), the process proceeds from a connector ① to step S3 of FIG. 5. An SMTP transmission is carried out to the selected SMTP server (here, the normal SMTP server), and a log of the SMTP transmission is formed (step S3). Then, when succeeding in the SMTP transmission, it is assumed that a transmission of an electronic mail succeeded, and the processing ends (step S4).

When failing in the SMTP transmission, the processing branches according to the contents of the error (step S5). For example, when a destination error generates and the electronic mail cannot be transmitted to the designated destination, a message indicating such a fact is output (step S6), and the processing ends without retransmitting the electronic mail. The destination error is mainly caused by an incorrect electronic mail address being input for the destination. Therefore, by not attempting to retransmit the electronic mail, unnecessary transmission can be reduced. The transmitter can be notified by a message indicating the generation of a destination error, and an appropriate measure (for example, to confirm a correct electronic mail address) can be taken.

For example, when a response cannot be obtained from the SMTP server, a prescribed period of time (for example, three minutes) is waited by a timer, and a TCP connection is established again to the same SMTP server (step S7) to attempt the SMTP transmission in step S5. Since the TCP connection has succeeded for this server, it can be assumed that there is no response due to a temporary failure. Next, when a cause of the failure in the transmission to the SMTP server is no response to command parameter, lack of capacity in a disk of the SMTP server, or a failure of the SMTP server to present service due to some reason, the SMTP server is changed. These problems are difficult to be solved within a short period of time, and are dealt with by changing the SMTP server. In this case, the process proceeds from a connector ② to step S8 of FIG. 4.

The determination of whether a bypass is possible can be made for each electronic mail transmission. Alternatively, the determination of whether a bypass is possible can be made according to an authority of the transmitter, or for each destination by referring to the bypass permission table 22 of FIG. 3. When bypassing, the mail server list 20 of FIG. 2 is referred, and an IP address of the SMTP server of next order is selected (step S9). Next, a TCP connection is established with the SMTP server of the next priority order (step S10). Then, an SMTP transmission is attempted under a route of step S2, step S3, and step S4.

Other than when going though the connector ② from the step S5, when failing in the TCP connection in step S2, it is determined whether bypass is possible in step S8. When failing in the TCP connection, it is difficult to establish a connection with the SMTP server of the destination for many cases. If it is on standby for a prescribed period of time, the transmission of the electronic mail is delayed. Therefore, it is immediately determined whether bypass is possible. The determination is made by using the bypass permission table, or by the transmitter determining for each transmission.

When not bypassing in step S8, or when there is no SMTP server next in step S9, a retransmission via the SMTP server ranked first in the priority order is attempted for each prescribed time, for a prescribed number of times. First, in step S11, a number of failures in the transmission is checked. This number relates to the transmission of the electronic mail, and for example, a limit on the number is set at ten times. When the number of times of the TCP connection is the limit or less, a prescribed period of time (for example, three minutes) is waited in step S12. Then, a TCP connection and an SMTP transmission are attempted again. When failing for more than a prescribed number of times, it can be assumed that the IP address of the SMTP server is incorrect. Therefore, a warning is issued that there is an error in the setting (step S13). Further, although not shown in the drawings, when going though step S13 and bypass is possible, a retransmission to the mail server of next order is attempted for each prescribed time, for a prescribed number of times. However, when bypass is possible, it is unlikely for the processing to proceed to step 11 through step S13.

As shown in FIG. 4 and FIG. 5, a transmission log is formed for each TCP connection or for each SMTP transmission. FIG. 6 shows an example of a transmission log table 24 that is formed. The log includes transmission date and time, destination, SMTP server that was used, and results of the transmission. In the case of FIG. 6, the TCP connection failed to be established with the first SMTP server, the SMTP server is immediately changed to the next SMTP server, and the transmission succeeded. Thus, the electronic mail can be traced for via which SMTP server the electronic mail was transmitted. As a result, reliability in the transmission is improved.

In the above-described embodiment, a plurality of SMTP servers are registered with the mail server list 20, a mail server is selected in accordance with the priority order set in the list 20, and the electronic mail is transmitted. Therefore, even when a failure generates in the mail server that is used normally, the electronic mail can be transmitted. Moreover, when selecting the SMTP server of the next in order, a waiting time is not provided substantially, and the connection is established with the SMTP server of the next in order. Therefore, there is no delay in the transmission of the electronic mail. When the possibility is high for the failure in the transmission to be caused by a temporary problem, a reconnection is attempted. Therefore, the SMTP server that is used normally has priority over other SMTP server. Furthermore, when the possibility for the transmission to succeed is low even when the SMTP server is changed (for example, when there is a destination error), a message indicating such a fact is output and the processing ends. Therefore, unnecessary communication is not repeated.

What is claimed is:

1. An electronic mail distribution system, comprising:
   an electronic mail client for transmitting an electronic mail via a mail server, the electronic mail client comprising:
      means for storing information representing a plurality of mail servers and a priority order of the respective mail servers;
      selection means for selecting a mail server for transmitting an electronic mail in accordance with the priority order stored in the means for storing;
      determining means for determining a type of failure that has occurred when the transmission of the electronic mail via the selected mail server fails, and for determining, in accordance with the type of failure determined, whether to select a mail server of next in priority order, to establish a connection again with the mail server that was selected at the time of the failure in the transmission of the electronic mail, or to cancel the transmission; and
      a bypass permission table which stores data indicating whether or not it is possible for the electronic mail client to bypass the selected mail server and transmit the electronic mail using another mail server,
      wherein, when the determining means determines in accordance with the type of failure that has occurred that a mail server of next in priority is to be selected and the bypass permission table indicates that bypass is possible, the selection means selects the mail server of next in priority order for transmitting the electronic mail, and
      when the determining means determines in accordance with the type of failure that has occurred that a mail server of next in priority order is to be selected and the bypass permission table indicates that bypass is not possible, a connection with the mail server ranked first in priority order is established again and the electronic mail is retransmitted via the mail server ranked first in priority order.

2. The electronic mail distribution system according to claim 1, wherein when the determining means determines that the type of failure is a failure in a connection with the selected mail server, a mail server of the next in priority order is selected.

3. The electronic mail distribution system according to claim 2, wherein when the determining means determines the failure in the connection with the selected mail server, the mail server of the next in priority order is selected immediately without waiting for an elapse of waiting time.

4. The electronic mail distribution system according to claim 1, wherein when a connection with the selected mail server is established but the determining means determines that the type of failure is a temporary error generated during a communication, the connection is established again with the mail server that was selected at the time of the failure in the transmission of the electronic mail.

5. The electronic mail distribution system according to claim 1, wherein when the determining means determines that the type of failure is a failure in transmission of the electronic mail due to incorrect destination, the transmission is cancelled.

6. The electronic mail distribution system according to claim 5, wherein when the determining means determines the failure in transmission of the electronic mail due to the incorrect destination, a message indicating such a fact is output, and the transmission is cancelled.

7. The electronic mail distribution system according to claim 1, further comprising:
- a plurality of electronic mail clients;
- a plurality of destinations of the electronic mail; and
- means for storing whether or not to select a mail server of next in priority order for each of the plurality of electronic mail clients or for each destination of the electronic mail.

8. The electronic mail distribution system according to claim 7, wherein the bypass permission table stores data indicating whether or not it is possible to bypass a selected mail server and select a mail server of next in priority order for each electronic mail client or each destination of the electronic mail.

9. The electronic mail distribution system according to claim 1, wherein there is a limit on whether or not to select a mail server of next in priority order according to a level of authority of the electronic mail client.

10. The electronic mail distribution system according to claim 1, wherein the electronic mail client can determine whether or not to select the mail server of next in priority order for each transmission of an electronic mail.

11. The electronic mail distribution system according to claim 1, further comprising a mail server list which stores the plurality of mail servers and the priority order of the plurality of mail servers, wherein the mail server list is rewritable.

12. The electronic mail distribution system according to claim 1, further comprising:
- means for forming a transmission log;
- wherein "transmission date and time", "destination", "mail server that was used", and "transmission result" are written in the transmission log.

13. The electronic mail distribution system according to claim 12, wherein the transmission log is formed for each Transmission Control Protocol (TCP) connection.

14. The electronic mail distribution system according to claim 12, wherein the transmission log is formed for each Simple Mail Transfer Protocol (SMTP) transmission.

15. A recording medium storing a program for controlling an electronic mail client which transmits an electronic mail via a mail server, the program controlling the electronic mail client to perform a method, comprising:

storing information representing a plurality of mail servers and a priority order of the respective mail servers;

selecting a mail server for transmitting an electronic mail in accordance with the stored priority order;

determining a type of failure that has occurred when transmission of the electronic mail via the selected mail server fails;

determining, in accordance with the type of failure determined, whether to select a mail server of next in priority order, to establish a connection again with the mail server that was selected at the time of failure in the transmission of the electronic mail or to cancel the transmission; and determining, based on a rewritable bypass permission table, whether or not it is possible to bypass the selected mail server for transmitting the electronic mail and to transmit the electronic mail using another mail server, wherein, when the determining, in accordance with the type of failure determined, determines to select a mail server of next in priority order, and the determining, based on the rewritable bypass transmission table, determines that it is possible to bypass the selected mail server, the selecting selects the mail server of next in priority order for transmitting the electronic mail, and when the determining, in accordance with the type of failure determined, determines to select a mail server of next in priority order, and the determining, based on the rewritable bypass permission table, determines that it is not possible to bypass the selected mail server, a connection with the mail server ranked first in priority order is established again and the electronic mail is retransmitted via the mail server ranked first in priority order.

* * * * *